United States Patent Office 2,816,071
Patented Dec. 10, 1957

2,816,071

METHOD OF TREATING LIME BASE DRILLING FLUIDS TO REDUCE WATER LOSS

Thomas E. Watkins, Arlington, Tex., assignor, by mesne assignments, to Socony Mobil Oil Company, Inc., a corporation of New York No Drawing. Application October 30, 1953, Serial No. 389,489

4 Claims. (Cl. 252—8.5)

This invention relates to drilling fluids and relates more particularly to the treatment of lime base drilling fluids to reduce water loss.

In the rotary drilling of oil and gas wells, a drilling fluid is employed for the purposes of lubricating the drill bit, carrying cuttings to the surface, and imposing a hydrostatic pressure to prevent flow of fluid from the drilled formations into the bore hole. Ordinary aqueous drilling fluids comprise essentially aqueous suspensions of a clay which imparts thixotropic properties to the suspensions, and lime base drilling fluids, used for particular purposes, comprise essentially aqueous suspensions of a clay which imparts thixotropic properties to the suspensions plus lime in excess of the stoichiometric amount required to react with the clay. With both of these types of drilling fluids, as the bore hole is drilled through porous formations, difficulty is encountered as a result of loss of water from the drilling fluid into the formations by filtration through the mud sheath formed from the drilling fluid on the wall of the bore hole. It is highly desirable to maintain this loss of water by filtration, or water loss as it is commonly termed, as low as possible in order not only to prevent changes in the viscosity and other properties of the drilling fluid but also to prevent clogging of the formation where the formation is productive of oil or gas. Various agents have been added to ordinary aqueous drilling fluids to reduce water loss, but these agents have not uniformly been found to be effective in lime base drilling fluids.

It is an object of this invention to improve the water loss properties of lime base drilling fluids. It is another object of this invention to provide a method for treating lime base drilling fluids which will effect a high degree of reduction in water loss properties in comparison with viscosity increase. Other objects of the invention will become apparent from the following description thereof.

In accordance with the invention, lime base drilling fluids are treated to reduce water loss by addition thereto of karaya gum.

I have found that the addition of karaya gum to lime base drilling fluids effectively reduces the water loss of the drilling fluids. Further, I have found that the decrease in the water loss of lime base drilling fluids upon addition of karaya gum is high in comparison with the increase in viscosity attendant upon addition of the gum. With the addition of any type of organic colloid to a drilling fluid, there is an increase in the viscosity of the drilling fluid, and the increase in viscosity of the drilling fluid upon addition of organic colloid water loss reducing agents presents serious limitations upon the extent to which the water loss may be reduced before increases in viscosity become excessive. By the process of the invention, the unit increase in viscosity per unit increase in water loss is small compared to starch which heretofore has commonly been employed to effect reduction in water loss of lime base drilling fluids.

It is realized that karaya gum has heretofore been employed in ordinary drilling fluids for reducing water loss. However, the use of karaya gum for reducing water loss of ordinary drilling fluids has never become extensive primarily because of the increase in viscosity of the drilling fluid upon addition of the karaya gum. While karaya gum has been used in ordinary drilling fluids, in so far as I am aware karaya gum has not been used in lime base drilling fluids and the use in lime base drilling fluids is to be distinguished from the use in ordinary drilling fluids.

Ordinary aqueous drilling fluids, as mentioned previously, comprise water and a clay, such as bentonite, which imparts thixotropic properties to the suspension. Various additives may be admixed with the suspension. The clay particles, consisting of sodium or aluminum silicate, form a colloidal suspension having, in varying degrees, gel strength, viscosity, water loss, and wall building properties required in a drilling fluid. However, upon admixture of the drilling fluid with sodium chloride, calcium chloride, calcium sulfate, or other salts picked up during drilling, the clay particles flocculate with resultant loss of gel strength and wall building properties and undesired large increase in viscosity and water loss.

A lime base drilling fluid differs markedly from an ordinary aqueous drilling fluid. A lime base drilling fluid contains water, clay, lime, and sodium hydroxide. By "lime" is meant calcium hydroxide. The amount of lime is in excess of the stoichiometric amount capable of combining with the clay. However, since the lime is relatively insoluble in water, only a relatively small portion of the available calcium is in the form of ions and, therefore, by the law of mass action, only a portion of the clay is combined with calcium ions to form calcium clay. Upon admixture of the lime and the clay in the presence of water, the portion of the clay which combines with calcium ions to form calcium clay flocculates but, upon aging, the flocculated clay particles reform to a colloidal suspension having desired drilling fluid properties. Further, since, as compared to drilling fluids containing a water-soluble calcium salt in excess of the stoichiometric amount capable of combining with the clay, only a portion of the clay combines with calcium ions to form calcium clay, the drilling fluid retains gel strength and wall building properties and the water loss does not become excessive. Contamination of a lime base drilling fluid with sodium chloride and other salts picked up during drilling therefore does not greatly affect the desired properties since a portion of the clay has already been flocculated and has reformed and is thereby immune to the flocculating tendencies of the salts. These drilling fluids accordingly are employed for drilling through salt domes, through formations containing salt water or anhydrite, through cement, through heaving shale, or through bentonite.

Usually, lime base drilling fluids contain about 5 to 25 pounds per barrel of lime and have a high pH, for example, a pH of at least 12, not only because of the calcium hydroxide present but also because of the sodium hydroxide which is employed to assist in counteracting the effects of contaminating salts. The amount of the sodium hydroxide is usually one-quarter of the amount of lime, on a weight basis. Because of the differences in the chemical nature and the pH of the clay suspension, treatments for improving water loss properties applicable to ordinary drilling fluids are not always applicable to lime base drilling fluids.

The following example will illustrate the fact that treatments applicable to ordinary drilling fluids are not applicable to lime base drilling fluids.

EXAMPLE I

An ordinary drilling fluid was prepared consisting of water and the following components in the amounts indicated:

| | Pounds per barrel of drilling fluid |
|---|---|
| High grade montmorillonite clay | 7 |
| High kaolinite content clay | 55 |
| Sodium chloride | 20 |

The water loss (API 30 minute water loss) was 88.7 cc. To this drilling fluid was added a commercial water loss reducing agent (sodium carboxymethylcellulose) in the amount of 2 pounds per barrel of drilling fluid. The water loss after addition of the agent was 19.3 cc.

A lime base drilling fluid was prepared consisting of water and the following components in the amounts indicated:

| | Pounds per barrel of drilling fluid |
|---|---|
| High grade sodium montmorillonite clay | 44 |
| Calcium montmorillonite clay | 132 |
| Quebracho | 2 |
| Sodium chloride | 18 |
| Sodium hydroxide | 1 |
| Calcium hydroxide | 4 |

The water loss of this drilling fluid was 84.2 cc. To this drilling fluid was added 2 pounds per barrel of sodium carboxymethylcellulose with resultant reduction in water loss to 77.5 cc.

It will be seen from this example that sodium carboxymethylcellulose effectively reduced the water loss of the ordinary drilling fluid but had only a slight effect on the water loss of the lime base drilling fluid.

The amount of karaya gum to be added to the lime base drilling fluids to reduce water loss will depend upon the extent to which the water loss is to be reduced and upon the composition of the lime base drilling fluid. Generally, amounts between 0.1 pound per barrel and 4 pounds per barrel will effectively reduce water loss. However, the proper amount to be added to any lime base drilling fluid to obtain a desired reduction in water loss may be determined by addition of varying amounts to samples of the drilling fluid and determining the water loss properties of the samples by conventional testing methods.

The following examples will be illustrative of the results to be obtained by the process of the invention.

EXAMPLE II

A lime base drilling fluid was prepared consisting of water and the following components in the amounts indicated:

| | Pounds per barrel of drilling fluid |
|---|---|
| Bentonite | 30 |
| Calcium montmorillonite clay | 64 |
| Quebracho | 1 |
| Sodium chloride | 18 |
| Sodium hydroxide | 1 |
| Calcium hydroxide | 8 |

To a portion of this drilling fluid, karaya gum was added in the amount of 2 pounds per barrel and the water loss, viscosity, and the initial and 10-minute gel strengths were measured. The mixture was then permitted to age at 170° F. and the same measurements were repeated at the end of 16 hours and at the end of 66 hours of aging. For purposes of comparing the effect of karaya gum in lime base drilling fluids with commercial water loss reducing agents, a commercial grade of starch used extensively for reducing water loss in lime base drilling fluids was added to another portion of the above drilling fluid in the amount of 2 pounds per barrel and the mixture was permitetd to age at 170° F. The water loss, viscosity, and initial and 10-minute gel strengths were measured prior to aging and at the end of 16 hours and 66 hours of aging. The table gives the results obtained.

Table 1

| Water Loss Reducing Agent | Karaya Gum | Starch |
|---|---|---|
| Water Loss—cc. (API 30 Minute Water Loss): | | |
| Initially | 14 | 68 |
| After aging for 16 hours | 15 | 42 |
| After aging for 66 hours | 14 | 26 |
| Viscosity—Centipoises (Stormer 600 R. P. M. Viscosity): | | |
| Initially | 153 | 60 |
| After aging for 16 hours | 122 | 46 |
| After aging for 66 hours | 67 | 70 |
| Initial Gel Strength—Grams: | | |
| Initially | 45 | 40 |
| After aging for 16 hours | 23 | 33 |
| After aging for 66 hours | 2 | 36 |
| 10-Minute Gel Strength—Grams: | | |
| Initially | 80 | 40 |
| After aging for 16 hours | 35 | 33 |
| After aging for 66 hours | 14 | 36 |

It will be observed from the table that karaya gum is an effective water loss reducing agent for lime base drilling fluids. Thus, two pounds per barrel of gum karaya reduced the water loss of the drilling fluid initially to 14 cc. On the other hand, the same amount of starch reduced the water loss to only 68 cc. Even after 16 hours of aging the water loss of the drilling fluid treated with gum karaya was still 14 cc. whereas the water loss of the drilling fluid treated with starch was 26 cc. It will be observed that the viscosities and gel strengths of the drilling fluid treated with gum karaya were initially higher than those of the drilling fluid treated with starch but with aging they decreased until they were lower than those of the drilling fluid treated with starch.

EXAMPLE III

To separate portions of freshly prepared drilling fluid having the same composition as the drilling fluid employed in Example II were added varying amounts of karaya gum. To other separate portions of the same drilling fluid were added varying amounts of starch. The drilling fluid samples were then stirred at 700 revolutions per minue for 20 minutes and immediately thereafter their water losses and viscosities were determined. Table II gives the results obtained.

Table II

| Water Loss Reducing Agent | None | Karaya Gum | Karaya Gum | Karaya Gum | Starch | Starch |
|---|---|---|---|---|---|---|
| Amount of Agent Added—pounds per barrel | | 0.10 | 0.25 | 0.50 | 1.0 | 2.0 |
| Water Loss—cc. (API 30 Minute Water Loss) | 97 | 86 | 45 | 33 | 81 | 70 |
| Viscosity—Centipoises (Stormer 600 R. P. M. Viscosity) | 40 | 47 | 80 | 90 | 60 | 70 |
| Ratio of Reduction in Water Loss to Increase in Viscosity | | 1.57 | 1.30 | 1.28 | 0.80 | 0.82 |

It will be observed from the table that even small amounts of karaya gum effectively reduce the water loss of lime base drilling fluid and that, for comparable reductions in water loss, much larger amounts of starch are required. It will also be observed from the table that karaya gum as compared with starch effects a greater unit reduction in water loss per unit increase in viscosity.

This is a continuation-in-part of my co-pending application Serial No. 181,912, filed August 28, 1950, now abandoned.

Having thus described my invention, it will be understood that such description has been given by way of illustration and example and not by way of limitation, reference for the latter purpose being had to the appended claims.

I claim:

1. A drilling fluid comprising in admixture water, clay, calcium hydroxide in an amount in excess of the stochiometric amount capable of combining with the clay, sodium hydroxide in an amount such that the pH of the drilling fluid is at least 12, and, as a water loss reducing agent, karaya gum.

2. A drilling fluid comprising in admixture water, clay, calcium hydroxide in an amount in excess of the stoichiometric amount capable of combining with the clay, sodium hydroxide in an amount such that the pH of the drilling fluid is at least 12, and, as a water loss reducing agent, karaya gum in an amount between about 0.1 pound and 4 pounds per barrel of said drilling fluid.

3. In the drilling of a well wherein there is circulated in said well a drilling fluid comprising in admixture water, clay, calcium hydroxide in an amount in excess of the stoichiometric amount capable of combining with the clay, and sodium hydroxide in an amount such that the pH of the drilling fluid is at least 12, the method of reducing the loss of water from the drilling fluid into the earth formations through the drilling fluid sheath formed on the walls of said well comprising adding to said drilling fluid karaya gum and circulating said drilling fluid in said well.

4. In the drilling of a well wherein there is circulated in said well a drilling fluid comprising in admixture water, clay, calcium hydroxide in an amount in excess of the stoichiometric amount capable of combining with the clay, and sodium hydroxide in an amount such that the pH of the drilling fluid is at least 12, the method of reducing the loss of water from the drilling fluid into the earth formations through the drilling fluid sheath formed on the walls of said well comprising adding to said drilling fluid karaya gum in an amount between about 0.1 pound and 4 pounds per barrel of said drilling fluid and circulating said drilling fluid in said well.

References Cited in the file of this patent

UNITED STATES PATENTS

| | | |
|---|---|---|
| 2,337,296 | Kennedy et al. | Dec. 21, 1943 |
| 2,364,434 | Foster | Dec. 5, 1944 |
| 2,551,768 | Sherborne | May 8, 1951 |
| 2,655,475 | Fischer et al. | Oct. 13, 1953 |

OTHER REFERENCES

Rogers: Composition and Properties of Oil Well Drilling Fluids, 1st Ed., pages 360, 361, 363 and 364 (1948), Pub. by Gulf Pub. Co., Houston, Texas.